United States Patent [19]
Andersson

[11] 3,999,649
[45] Dec. 28, 1976

[54] SCRAPER BAR ASSEMBLY FOR ENDLESS CONVEYOR BELT

[75] Inventor: Sven E. Andersson, Chagrin Falls, Ohio

[73] Assignee: Trelleborg Rubber Company, Inc., Solon, Ohio

[22] Filed: Nov. 3, 1975

[21] Appl. No.: 628,388

[52] U.S. Cl. .............................. 198/499; 15/256.5
[51] Int. Cl.² ........................................ B65G 45/00
[58] Field of Search .................. 198/188, 229, 230; 74/230; 15/93 R, 236 RA, 256.5

[56] References Cited
UNITED STATES PATENTS

| 1,875,442 | 9/1932 | Greg ................................ 198/230 |
| 2,227,776 | 1/1941 | Anderson ......................... 198/229 |
| 2,393,724 | 1/1946 | Vickers ............................ 198/230 |

FOREIGN PATENTS OR APPLICATIONS

| 10,047 | 4/1912 | United Kingdom ............... 198/188 |
| 503,636 | 4/1939 | United Kingdom ............... 198/230 |

Primary Examiner—Evon C. Blunk
Assistant Examiner—Joseph E. Valenza
Attorney, Agent, or Firm—Meyer, Tilberry & Body

[57] ABSTRACT

A scraper assembly is pivotally supported for biased engagement with the outer surface of a moving conveyor belt to clean the belt surface. The scraper assembly includes a plurality of scraper bars spaced along the length of an elongate carrier which is disposed transverse to the side edges of the belt. Each scraper belt is removably mounted on the carrier, and the bars on opposite sides of the center line of the belt are parallel to one another and inclined at an angle with respect to the bent center line. Adjacent ones of the parallel bars have side edges which overlap with respect to an imaginary line intersecting the edges and extending parallel to the bent center line. The scraper bars engage the belt surface, and material clinging to the surface is displaced laterally outwardly toward the opposite sides of the belt.

17 Claims, 8 Drawing Figures

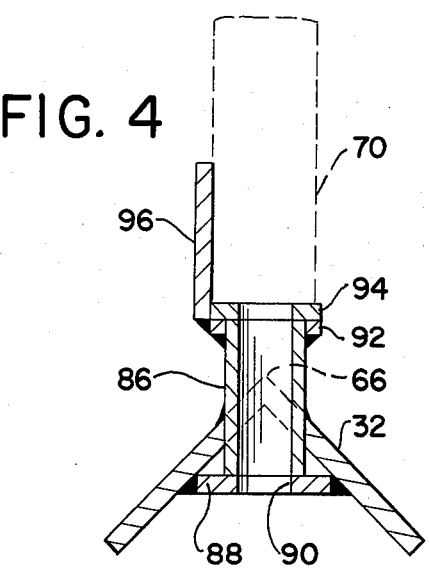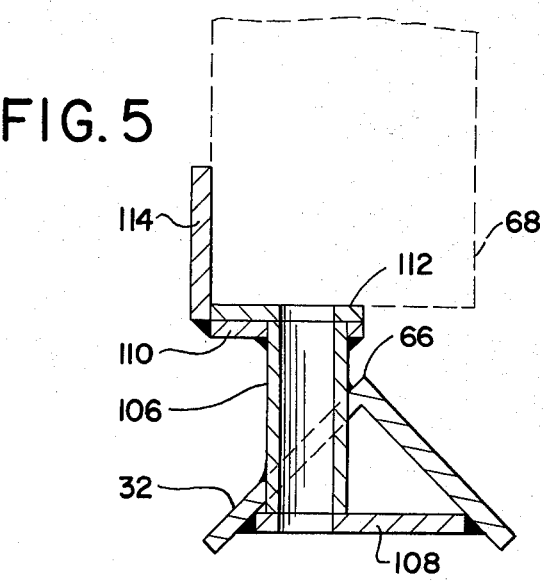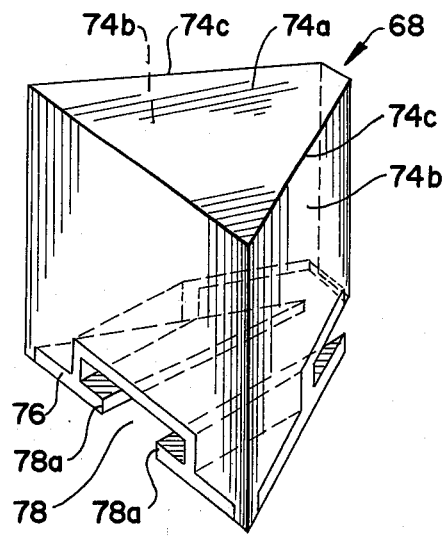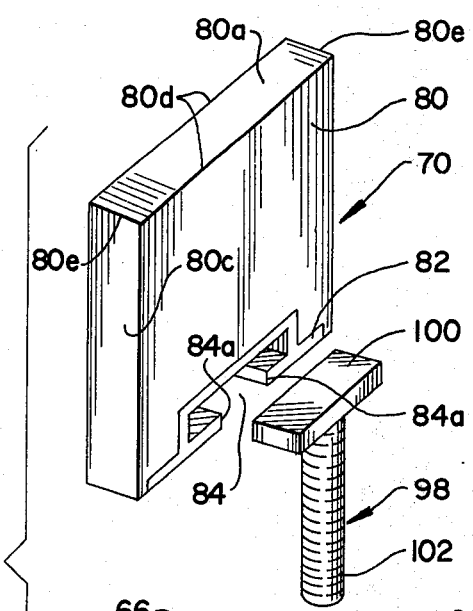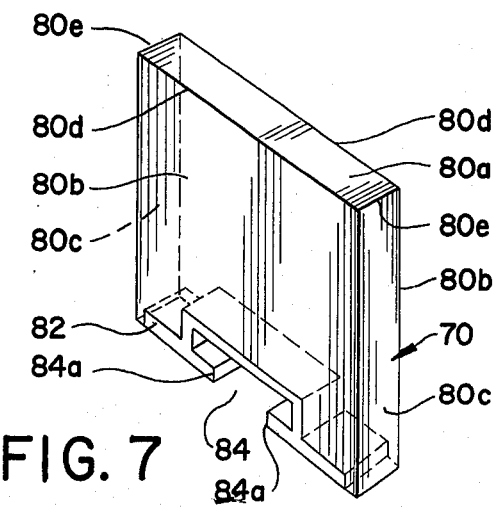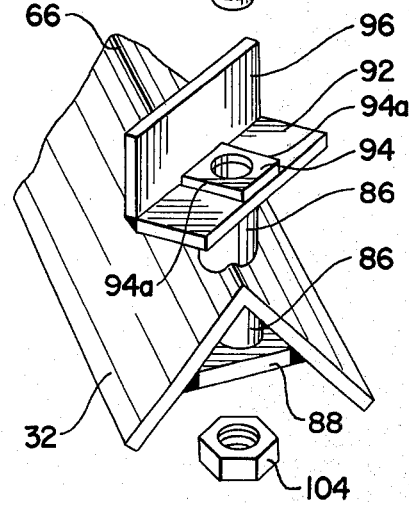

SCRAPER BAR ASSEMBLY FOR ENDLESS CONVEYOR BELT

The present invention relates to the art of endless conveyors and, more particularly, to a scraper assembly for cleaning a surface of an endless conveyor belt.

It is of course well known that an endless belt-type conveyor basically is comprised of a pair of spaced apart belt supporting drums and an endless belt of rubber, fabric or the like, which is trained around the drums to perform a conveying function in response to drum rotation. During the use of such a conveyor it is often necessary or desirable to clean the outer and/or inner faces of the belt to rid the surfaces of material clinging thereto which might be detrimental to conveyor operation, belt life or the like. Such cleaning is especially necessary where the conveyor is employed to transfer pulverulent or powdery material and a portion of which material tends to cling to the conveying surface of the belt when the belt moves around the drum at the discharge end of the conveyor. Accordingly, many devices and arrangements have been devised for cleaning the belt surface, and among these arrangements are scraper devices which engage the belt surface during movement of the belt relative to the scraper.

Scraper arrangements heretofore provided for the foregoing purpose have many structural and/or functional drawbacks. For example, certain of the prior scraper arrangements include a single elongate scraper element or blade extending between the side edges of the conveyor belt to continuously engage the belt surface across the width thereof. Such continuity of engagement creates a build-up of material along the leading edge of the blade with respect to the direction of belt travel. This material build-up is detrimental to engagement of the blade with the belt surface and can result in displacement of the belt relative to the blade such that a portion of the material to be removed from the belt passes between the belt and blade. Accordingly, such build-up requires frequent cleaning of the scraper to avoid the latter problem and this results in considerable down time for the conveyor. While the material bypass problem may be alleviated at least to a certain extent by increasing the pressure of engagement between the blade and belt, this does not avoid the material accumulation problem along the leading edge of the scraper blade. Moreover, such pressure increases the belt wear, especially if the scraper is metal.

An additional problem encountered in connection with scraper arrangements heretofore provided is the fact that the material removed from the belt surface is not directionally controlled with respect to the descent thereof from the belt toward the floor beneath the conveyor or a suitable receptacle provided beneath the apparatus to catch the material. Accordingly, there is little or no control over the distribution of the material being removed with respect to the area beneath the conveyor belt. This can lead to increasing the frequency of cleaning operations required to maintain either the areas laterally of the conveyor clear of such material and/or the area beneath the conveyor clear of a pile of sufficient height to cause spillage laterally outwardly of the conveyor.

Still another problem attendant to scraper arrangements heretofore provided resides in the fact that the scraper element is of one piece construction, or is an assembly of components structurally interrelated such that disassembly thereof is not conveniently possible without removal of the entire unit from its assembled relationship with respect to the conveyor. Therefore, the time and cost of maintenance and replacement operations is undesirably high. Moreover, should a portion of the scraper element become damaged or worn, the entire scraper element must be replaced if it is of one piece construction. This too adds to the cost of maintenance.

In accordance with the present invention, an improved scraper assembly for an endless conveyor belt is provided by which the foregoing disadvantages and others of previous scraper arrangements are avoided or minimized. More particularly, the scraper assembly of the present invention includes a plurality of scraper elements each having an end engaging the belt surface and extending at an inclined angle with respect to the path of movement of the belt. The scraper elements are mounted on a carrier member in spaced apart relationship and, preferably, the carrier member is supported and biased to displace the scraper elements toward the belt for engagement therewith.

The provision of a plurality of separate scraper elements advantageously provides for the material clinging to the belt to be broken up in a plurality of areas between the belt sides, thus to both minimize material build-up on the scraper elements and to more uniformly distribute the removed material with respect to the area beneath the conveyor. Moreover, the inclined disposition of the belt engaging end of each element with respect to the sides of the belt further minimizes material build-up such as would be encountered with a scraper edge transverse to the path of belt movement. Still further, the minimizing of material build-up in the foregoing manner reduces the frequency of cleaning operations required with respect to the scraper elements and also enables a reduction in the pressure of engagement required between the scraper elements and belt to achieve the desired scraping function. In this regard, minimum build-up with respect to a given scraper element reduces the likelihood of belt deflection relative thereto which results in material passing between the belt and scraper element and not being removed from the belt. Therefore, the pressure of engagement can be considerably reduced without encountering such material bypass, and this advantageously leads to longer belt and scraper element life by reducing the wear thereon.

In accordance with another aspect of the present invention, the individual scraper elements are each removably mounted on the carrier member. Accordingly, should one of the elements become worn or damaged, the element can be removed from the carrier and replaced without disturbing the other scraper elements or disassembling the carrier with respect to the conveyor. In accordance with yet another aspect of the invention, the belt engaging ends of adjacent ones of the scraper elements have portions disposed in overlapping relationship laterally of the direction of belt movement to assure that all of the material clinging to the belt moves along a path which will carry it into engagement with a scraper element.

In accordance with a preferred embodiment of the invention, the scraper elements include a rubber body portion vulcanized or otherwise bonded to a corresponding mounting plate having a T-slot therein adapted to receive the head of a T-bolt by which the scraper element is interconnected with a mounting bracket therefor on the carrier member. Further in accordance with the preferred embodiment, the scraper elements on laterally opposite sides of the center line of the conveyor belt are inclined in opposite directions with respect to the center line, and the carrier member is an inverted angle iron underlying the scraper elements. This structure further adds to the uniformity and direction of distribution of material removed from the belt.

It is accordingly an outstanding object of the present invention to provide an improved scraper assembly for scraping the surface of an endless conveyor belt.

Another object is the provision of a scraper assembly of the foregoing character by which material removal from a conveyor belt and the distribution of the removed material is more efficient and uniform than heretofore possible.

Yet another object is the provision of a scraper assembly of the foregoing character comprised of a plurality of individual scraper elements oriented relative to the direction of belt movement to minimize material build-up on the scraper elements.

A further object is the provision of a scraper assembly of the foregoing character by which improved characteristics of wear are realized with respect to the scraper elements and conveyor belt.

Still a further object is the provision of a scraper assembly of the foregoing character in which the individual scraper elements are removably mounted on a carrier member.

Yet another object is the provision of a scraper assembly of the foregoing character which is structurally simple and economical to produce, assemble, install and maintain.

The foregoing objects and others will in part be obvious and in part pointed out more fully hereinafter in conjunction with the written description of a preferred embodiment of the invention illustrated in the accompanying drawings in which:

FIG. 4 is a cross-sectional elevation view of the carrier member and a mounting bracket taken along line 4—4 in FIG. 3;

FIG. 5 is a cross-sectional elevation view of the carrier member and another mounting bracket taken along line 5—5 in FIG. 3;

FIG. 6 is a perspective view of the center scraper element;

FIG. 7 is a perspective view of a side scraper element; and,

FIG. 8 is an exploded perspective view of components of the scraper assembly.

Figure 1:
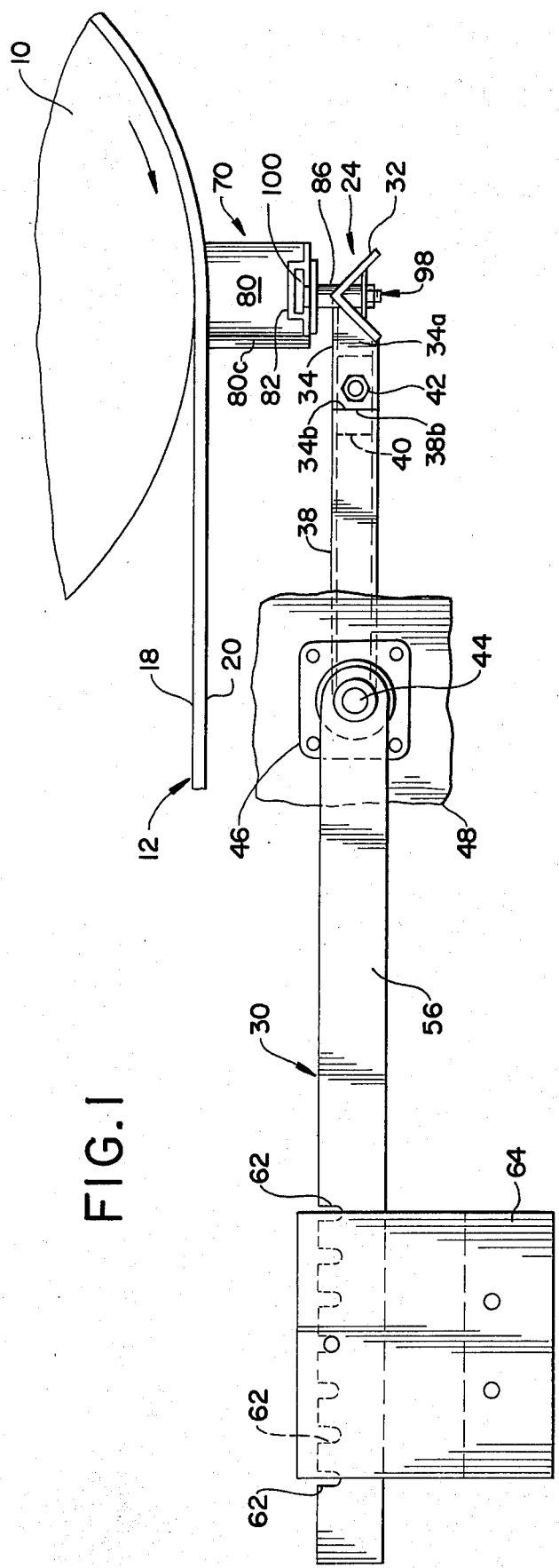
FIG. 1 is a side elevation view of a scraper assembly made in accordance with the present invention.
Figure 2:
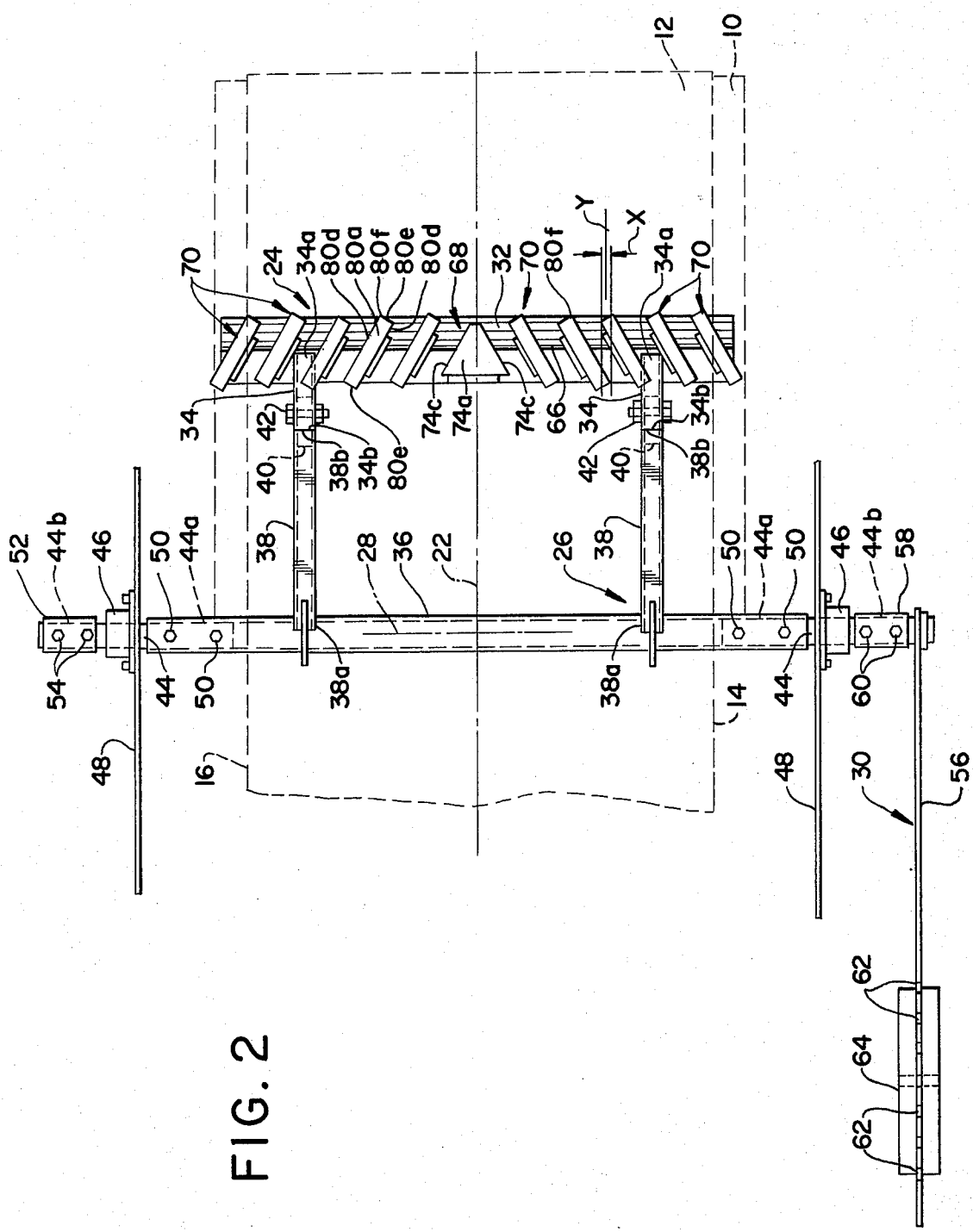
FIG. 2 is a plan view of the scraper assembly shown in FIG. 1.

Referring now in greater detail to the drawing wherein the showings are for the purpose of illustrating a preferred embodiment of the invention only and not for the purpose of limiting the invention, a scraper bar assembly is illustrated in FIGS. 1 and 2 in association with the drum 10 and belt 12 of an endless belt-type conveyor. As will become apparent hereinafter, the scraper assembly is not limited in use to a specific belt-type conveyor structure and, accordingly, the structure and operation of the conveyor is not important to the present invention and is not illustrated in detail. It will be appreciated for purposes of the ensuing description, however, that the belt member of such a conveyor has opposite side edges 14 and 16, inner and outer surfaces 18 and 20, respectively, with regard to drum 10, and a center line 22 extending longitudinally with respect to the direction of travel of the belt in response to drum rotation.

The scraper assembly includes a scraper bar unit 24 extending laterally between belt edges 14 and 16, a rocker bar assembly 26 supporting the scraper bar unit for pivotal movement toward and away from belt 12 about a horizontal axis 28 perpendicular to belt edges 14 and 16, and a counterweight assembly 30 for biasing the scraper bar unit to pivot in the direction toward belt 12. Scraper bar unit 24, which is described in greater detail hereinafter, includes an elongate carrier member 32 extending laterally of belt 12 and provided along the length thereof with a pair of tubular attaching legs 34 having inner ends 34a welded or otherwise secured to carrier member 32 and outer ends 34b facing rocker bar assembly 26. Rocker bar assembly 26 includes a tubular shaft 36 provided along its length with a pair of support arms 38 having inner ends 38a welded or otherwise secured to shaft 36 and outer ends 38b aligned with ends 34b of the corresponding attaching leg 34 on carrier member 32. Preferably, arms 38 and legs 34 are rectangular in cross-section, and outer end 38b of each arm 38 is provided with a plug 40 having one end disposed within arm 38 and secured thereto such as by welding, the other end of each plug 40 is removably received in the corresponding leg 34 and is secured thereto such as by a nut and bolt assembly 42. This arrangement advantageously provides for the scraper bar unit to be readily detached as a unit from the rocker bar and counterweight assemblies.

Tubular shaft 36 of rocker bar assembly 26 is supported for rotation about axis 28 by means of shaft rods 44 at opposite ends of the tubular shaft. Each of the shaft rods 44 extends through and is supported for rotation by a corresponding bearing unit 46 which is bolted or otherwise secured to a corresponding support wall 48. Walls 48 may be a part of or attached to the frame structure of the conveyor, or they may be components of a separate support arrangement for the scraper assembly mounted on a support surface such as the floor underlying the conveyor. Any suitable support arrangement can be devised to provide the support function of walls 48. Each of the shaft rods 44 has an inner end 44a received in the corresponding end of tubular shaft 36 and attached thereto such as by bolts 50. Each of the shaft rods further has an outer end 44b extending through and axially outwardly from the corresponding bearing unit 46. Counterweight assembly 30 is attached to end 44b of the shaft rod 44 adjacent belt edge 14, and outer end 44b of the shaft rod at the opposite end of tubular shaft 36 is provided with a retaining sleeve 52 attached thereto by means of bolts 54.

Counterweight assembly 30 includes a counterweight arm 56 having one end attached to shaft rod 44 by means of a sleeve 58 which is welded or otherwise secured to arm 56. Sleeve 58 receives shaft rod end 44b and is attached to the shaft rod against rotation relative thereto such as by means of bolts 60. The end of arm 56 spaced from shaft axis 28 is provided with a plurality of notches 62 which provide for a suitable counterweight 64 to be positionally adjustable toward and away from shaft axis 28. Accordingly, it will be appreciated that counterweight 64 biases tubular shaft 36 counterclockwise as seen in FIG. 1 to displace scraper bar unit 24 toward belt 12, and that the biasing force is adjustable by changing the position of counterweight 64 on arm 56.

The structures of the components of scraper bar unit 24 and the structural interrelationships therebetween are best seen in FIGS. 3–8 of the drawing. With reference to the latter Figures, in conjunction with the showings of FIGS. 1 and 2, carrier member 32 preferably is in the form of an angle iron inverted with respect to drum 10 and belt 12 and having an upper edge 66 extending horizontally and parallel to shaft axis 28. The opposite ends of carrier member 32 preferably extend slightly beyond the corresponding side edge of belt 12. Carrier member 32 supports a plurality of individual scraper elements including a center scraper bar 68 aligned with belt center line 22, and sets of scraper bars 70 on opposite sides of center bar 68. Each of the scraper bars 68 and 70 is removably attached to carrier member 32 by means including a corresponding bracket mounted on the carrier member, as set forth more fully hereinafter.

In the embodiment shown, as best seen in FIGS. 2 and 6, center scraper bar 68 is generally triangular in horizontal cross-section and is comprised of a body 74 of rubber vulcanized or otherwise bonded to a mounting plate 76. Mounting plate 76 is a metal member having a T-slot 78 therethrough which includes an entrance defined by spaced apart edges 78a. Top surface 74a of body 74 is generally triangular and engages surface 20 of conveyor belt 12. Opposite side faces 74b of body 74 intersect top surface 74a to define scraper edges 74c. Edges 74c are at an inclined angle with respect to belt edges 14 and 16 and converge with respect to belt center line 22 in the direction toward the leading edge of the scraper bar unit.

Scraper bars 70 are of identical structure and, as seen in FIGS. 2 and 7, include a body 80 of rubber vulcanized or otherwise bonded to a mounting plate 82 having a T-slot 84 therethrough. Preferably, for the reason set forth hereinafter, mounting plate 82 is identical in cross-section to mounting plate 76 of center scraper bar 68, and includes an entrance defined by spaced apart edges 84a. Body 80 is generally rectangular in horizontal cross-section and includes a rectangular top surface 80a which engages belt surface 20. Opposite side faces 80b of body 80 and opposite end faces 80c thereof intersect top surface 80a to define scraper edges 80d and 80e, respectively. Each scraper bar 70 is mounted on carrier member 32 for the major axis of top surface 80a and thus scraper edges 80d to be at an inclined angle with respect to belt edges 14 and 16. Preferably, scraper edges 80d of adjacent scraper bars 70 are parallel to one another and to scraper edges 74c of center bar 68. Thus, scraper edges 80d converge toward belt center line 22 in the direction corresponding to the leading edge of the scraper bar unit.

The angle of inclination of the scraper edges with respect to belt center line 22 is other than 90°. This, together with the rectangular configuration of top surface 80a of scraper bars 70, provides for each scraper edge 80e at the leading end of a scraper bar 70 to intersect the laterally outer scraper edge 80d thereof at a corner 80f. It will be appreciated that each corner 80f provides a plow-like configuration at the leading end of the corresponding scraper bar 70. Still further, the angle of inclination of scraper elements 70 and the lateral positioning thereof relative to one another provides for the top surfaces 80a of adjacent ones of the scraper bars to have laterally overlapping portions at the leading end of one of the bars and the trailing end of the other bar. This overlap is shown in FIG. 2 in connection with the opposed scraper edges 80c of laterally adjacent scraper bars 70. More particularly, as seen in FIG. 2, the front portion of laterally inner scraper edge 80d of one scraper bar 70 and the rear portion of laterally outer scraper edge 80d of the laterally inwardly adjacent scraper bar 70 have an overlap X with respect to an imaginary reference line Y intersecting the scraper edges 80d and extending parallel to belt edges 14 and 16. It will be appreciated that this overlap relationship also exists between the opposed scraper edges of the belt engaging ends of center scraper bar 68 and the scraper bar 70 immediately adjacent thereto.

The foregoing structure of scraper bars 70 and the orientation thereof relative to belt 12 provides for material clinging to belt surface 20 to be plowed by the leading edges 80f and thus directed into the space between adjacent ones of the elements, and for all of the material on the belt to engage an inclined scraper surface somewhere between the leading and trailing ends of the scraper bars. Accordingly, the material is both laterally and longitudinally deflected relative to the belt surface and, in falling therefrom, is laterally distributed relative to the bent center line with a considerable degree of uniformity.

Figure 3:
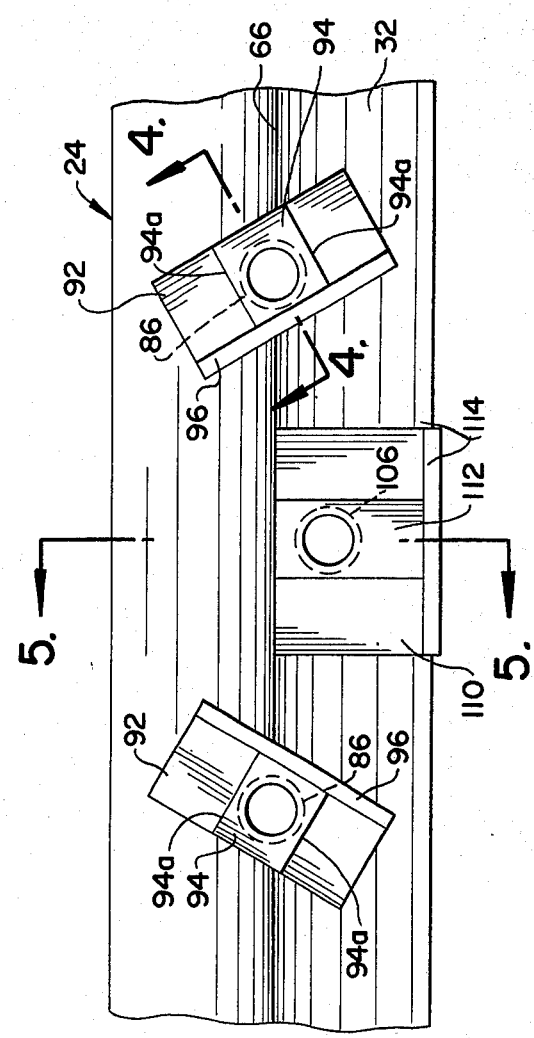
FIG. 3 is an enlarged plan view of the center portion of the carrier member of the scraper assembly showing scraper element mounting brackets thereon.

To facilitate the individual mounting of the scraper elements on carrier member 32, the latter is provided with a mounting bracket for each of the scraper elements. The mounting brackets for scraper bars 70 are identical in structure and are oriented relative to carrier 32 to provide the desired inclination for the belt engaging ends thereof relative to belt edges 14 and 16 and belt center line 22. As seen in FIGS. 3 and 4, the mounting brackets for scraper bars 70 include a tubular post 86 extending through an opening therefor in carrier member 32 and having a lower end welded or otherwise secured to a corresponding spanner plate 88 extending between and welded to the legs of the carrier member. Plate 88 is provided with a circular opening 90 aligned with the opening through post 86. The upper or outer end of post 86 is provided with a horizontal base plate 92 which is apertured to receive the post and to which the post is welded or otherwise secured. Base plate 92 is adapted to underlie mounting plate 82 of a scraper bar 70, and an alignment plate 94 is welded or otherwise attached to the upper end of post 86 for the purpose set forth hereinafter. Preferably, the mounting bracket further includes a back-up plate 96 welded or otherwise interconnected with base plate 92 and against which one of the faces 80b of scraper bar 70 rests when the latter is mounted on the bracket.

As mentioned hereinbefore and shown in FIG. 7, T-slot 84 of mounting plate 82 of scraper bar 70 includes an entrance defined by spaced apart edges 84a. Alignment plate 94 has side edges 94a spaced apart a distance corresponding to the spacing between edges 84a, whereby the alignment plate is adapted to be received in the T-slot entrance. Thus, alignment plate 94 and the T-slot entrance interengage to stablize the scraper bar relative to the bracket and to align the T-slot entrance with the opening through post 86. As seen in FIG. 8, scraper bar 70 is removably attached to the bracket by means of a bolt 98 having a rectangular head 100 received in the T-slot behind the entrance thereof. Bolt 98 includes a shank 102 received in tubular post 86. The lower end of shank 102 is threaded to receive a nut 104 which engages the underside of spanner plate 88 to releaseably fasten the scraper bar in place with respect to carrier 32.

The mounting bracket for center scraper bar 68 is structurally similar to the bracket for side bars 70 and in this respect, as seen in FIGS. 3 and 5, includes a tubular post 106, a spanner plate 108 beneath carrier member 32, a base plate 110, an alignment plate 112, and a back-up plate 114. The side edges of alignment plate 112 are spaced apart a distance corresponding to the space between edges 78a of entrance 74 in the mounting plate of center scraper bar 68. Thus, alignment plates 94 and 112 are structurally and functionally the same with respect to their corresponding bracket and scraper bar. It will be appreciated that the center scraper bar is mounted on carrier member 32 by means of a nut and bolt similar to bolt 98 and nut 104 and which interengage with the bracket in the manner described in connection with scraper bar 70.

Tubular post 86 of the bracket structure for scraper bars 70 is located generally at the apex of the inverted angle iron carrier member, whereas tubular post 106 of the bracket for the center scraper bar is offset from the apex toward the trailing edge of the carrier member with respect to the direction of belt travel. Moreover, back-up plate 114 and alignment plate 112 of the bracket for the center scraper bar are oriented parallel to the axis of carrier member 32. It will be appreciated that these structural distinctions are provided to accommodate the triangular configuration of the center scraper bar and the inclined disposition of the side scraper bars with respect to the center line of the belt.

Advantageously, both the center scraper bar and the side scraper bars 70 can readily be produced from a single elongated strip of rubber vulcanized or otherwise bonded to an extruded mounting strip having the desired T-slot configuration. In this respect, such an elongated strip is merely cut to provide scraper elements 70 having a desired thickness in the direction parallel to the T-slot. The center scraper bar is cut from the strip to provide the desired length between the leading and trailing edges thereof, and the sides thereof including the sides of the extruded mounting bar are cut to provide the triangular configuration.

From the foregoing description, it will be appreciated that the belt engaging ends of the center and side scraper elements are biased against belt surface 20 by means of counterweight 64. During belt movement relative to the elements from right to left as indicated in FIGS. 1 and 2, material clinging to belt surface 20 is engaged in a plurality of areas across the belt and is broken up into sections of material which are displaced laterally of the belt as a result of the inclined disposition of the scraper edges of the individual elements. This lateral displacement of the material loosens the material for descent from the belt by gravity and/or displaces the material laterally against material on the belt laterally beyond the leading most edges of the individual elements. The latter displacement of material further tends to loosen the material from the belt for descent therefrom from gravity, and any material remaining on the belt then engages the inclined side edges of the scraper elements and is displaced laterally relative to the path of belt movement.

With further regard to the scraping action, the portions of material on the belt engaging the leading plow edges of the scraper elements so as to be initially displaced laterally inwardly of the belt will eventually be displaced laterally outwardly of the belt if not initially loosened sufficiently to drop from the belt surface. In this respect, the material will be initially displaced laterally inwardly toward the adjacent element with which it overlaps, and thence will engage the trailing edge of the adjacent element so as to be displaced laterally outwardly. Double lateral displacement of the material in this manner decreases the likelihood of material being retained on the belt so as to bypass the scraper unit. Further, the material engaging the scraper edges of the center bar and the laterally outer scraper edges of bars 70 is displaced laterally of the belt along a long inclined path defined by the scraper edge. This long path and continued lateral displacement also decreases the likelihood of material being retained on the belt.

Preferably, as shown in FIGS. 1 and 2, the scraper elements of scraper unit 24 underlie the belt drum so as to engage the belt before the latter separates from the drum. With this arrangement the drum provides a back-up surface to maintain the belt flat during the scraping operation. However, it will be appreciated that the scraper assembly can be associated with the belt at any desired location beyond the point at which the material being conveyed thereon is discharged at the discharge end of the conveyor. Further, while it is preferred to mount the scraper bar unit so that the scraper bar elements are adjustably biased into engagement with the belt surface, it will be appreciated that the scraper bar unit could be mounted in a fixed position for engagement of the elements thereof with the belt. Still further, it will be appreciated that structural arrangements other than the pivotal arrangement herein shown can be provided for mounting the scraper bar unit for movement toward and away from the belt and for biasing displacement of the unit toward the belt.

While considerable emphasis has been placed herein on the structures of the scraper elements and the structural interrelationships therebetween, it will be appreciated that the desired operation of the scraper assembly can be achieved with arrangements other than the arrangement herein illustrated and described. In this respect, for example, the number of scraper elements 70 does not have to be equal on opposite sides of the center element and, moreover, the center element could be omitted and the entire scraper bar comprised of scraper bars 70 inclined in the same or opposite directions. Further, the center scraper bar can be oriented to one side or the other of the center line of the belt. Likewise, it will be appreciated that laterally adjacent scraper bar elements need not be aligned with respect to a common axis such as that provided by the apex of the angle iron carrier bar. For example, adjacent scraper bars could be dimensionally different and/or longitudinally offset with respect to the direction of belt travel without departing from the principles of the present invention. Still further, the scraper bars can be of cross-sectional configurations other than the triangular and rectangular configurations of the preferred embodiment. Moreover, while a preferred scraper element mounting arrangement is disclosed to provide for the elements to be individually removably mounted on the carrier member, it will be appreciated that the elements could be fixedly secured to the carrier bar or removably mounted thereon by arrangements other than the preferred arrangement disclosed.

As many embodiments of the present invention may be made and as many changes may be made in the embodiment herein illustrated and described, it is to be distinctly understood that the foregoing descriptive matter is to be interpreted merely as illustrative of the present invention and not as a limitation.

What is claimed is:

1. A scraper assembly for an endless conveyor belt having a belt surface and opposite side edges comprising, a plurality of spaced apart scraper elements, said scraper elements having mounting ends and belt engaging ends spaced from said mounting ends and including scraper edges, means including a carrier member supporting said scraper elements for said belt engaging ends to engage said belt surface, said scraper edges extending at an inclined angle with respect to said belt side edges, the belt engaging ends of adjacent ones of said scraper elements having portions overlapping with respect to an imaginary line therethrough parallel to said belt side edges, said mounting end of each scraper element having a T-slot therethrough, and means removably mounting said scraper element on said carrier member including a bolt having a head received in said T-slot and a shank interengaged with said carrier member.

2. The scraper assembly according to claim 1, wherein said means including a carrier member includes means supporting said carrier member for pivotal movement in opposite directions about an axis, said pivotal movement displacing said belt engaging ends of said scraper elements toward and away from said belt surface, and means biasing said carrier member in the direction to displace said belt engaging ends toward said belt surface.

3. The scraper assembly according to claim 1, wherein said belt engaging ends of said scraper elements are rubber.

4. The scraper assembly according to claim 1, wherein said belt engaging ends of said scraper elements include second scraper edges intersecting the corresponding first named scraper edges and extending at an inclined angle with respect to said belt side edges.

5. The scraper assembly according to claim 1, wherein said belt engaging ends of said scraper elements are rectangular in cross-section and have a major axis, said plurality of scraper elements including first and second sets of scraper elements on opposite sides of a reference line parallel to said belt side edges, the major axes of said belt engaging ends of each set being parallel to one another and at an angle with respect to the belt engaging ends of the other set.

6. The scraper assembly according to claim 5, wherein said means including a carrier member includes means supporting said carrier member for pivotal movement in opposite directions about an axis, said pivotal movement displacing said belt engaging ends of said scraper elements toward and away from said belt surface, and means biasing said carrier member in the direction to displace said belt engaging ends toward said belt surface.

7. The scraper assembly according to claim 6, wherein said biasing means is adjustable.

8. A scraper assembly for an endless conveyor belt having a belt surface and opposite side edges comprising, a carrier member having opposite ends and extending transverse to said belt side edges and parallel to said belt surface, means supporting said carrier member for pivotal movement about a pivot axis spaced from and parallel to said carrier member, a plurality of scraper bars spaced apart along said carrier member, means removably mounting each of said scraper bars on said carrier member, said scraper bars having belt engaging ends spaced from said carrier member and side portions overlapping in the direction between said opposite ends of said carrier member, pivotal movement of said carrier member in opposite directions about said pivot axis displacing the belt engaging ends of said scraper bars toward and away from said belt surface, means biasing said carrier member to pivot in the direction displacing said scraper bar ends toward said belt, each of said scraper bars including a metal mounting plate and a body of rubber attached to said mounting plate and having an end spaced from said mounting plate and defining said belt engaging end, said mounting plate having a T-slot therethrough, said means removably mounting said scraper bar on said carrier member including a bolt having a shank and a head, said head being receivable in said T-slot, bracket means on said carrier member to receive said shank, and nut means to interengage said shank and bracket means.

9. The scraper according to claim 8, wherein said carrier member is an inverted metal angle and said bracket means includes sleeve means attached to said angle and extending vertically through an opening therein to receive said bolt shank, said sleeve means having upper and lower ends on opposite sides of said angle, and a base plate on said upper end to receive said mounting plate, said nut means engaging said bracket means at said lower end of said sleeve means.

10. The scraper assembly according to claim 8, wherein said body of rubber is rectangular in cross-section and said belt engaging end thereof has a major axis extending at an inclined angle with respect to said belt side edges.

11. The scraper assembly according to claim 10, wherein said carrier member has a reference point between said opposite ends thereof, said plurality of scraper bars including first and second pluralities of bars on opposite sides of said reference point, the major axes of the belt engaging ends of said first plurality being parallel to one another, the major axes of the belt engaging ends of said second plurality being parallel to one another, and the major axes of said first and second pluralities having corresponding ends converging with respect to said reference point.

12. The scraper assembly according to claim 11, wherein said means supporting said carrier member includes a shaft parallel to and interconnected with said carrier and pivotal about said pivot axis, and said biasing means includes an arm attached to said shaft and extending therefrom transverse to said pivot axis and a weight selectively positionable along said arm.

13. The scraper assembly according to claim 11, wherein said carrier member is an inverted metal angle and said bracket means includes sleeve means attached to said angle and extending vertically through an opening therein to receive said bolt shank, said sleeve means having upper and lower ends on opposite sides of said angle, and a base plate on said upper end to receive said mounting plate, said nut means engaging said bracket means at said lower end of said sleeve means.

14. A scraper assembly for an endless conveyor belt having a belt surface and opposite side edges comprising, a carrier member having opposite ends and extending transverse to said belt side edges and parallel to said belt surface, means support said carrier member for pivotal movement about a pivot axis spaced from and parallel to said carrier member, a plurality of scraper bars spaced apart along said carrier member, means removably mounting each of said scraper bars on said carrier member, said scraper bars having belt engaging ends spaced from said carrier member and side portions overlapping in the direction between said opposite ends of said carrier member, pivotal movement of said carrier member in opposite directions about said pivot axis displacing the belt engaging ends of said scraper bars toward and away from said belt surface, means biasing said carrier member to pivot in the direction displacing said scraper bar ends toward said belt, each of said scraper bars including a metal mounting plate and a body of rubber attached to said mounting plate and having an end spaced from said mounting plate and defining said belt engaging end, said mounting plate having a T-slot therethrough, said means removably mounting said scraper bar on said carrier member including a bolt having a shank and a head, said head being receivable on said T-slot, and means interengaging said shank and said carrier member.

15. The scraper assembly according to claim 14, wherein said body of rubber is rectangular in cross-section and said belt engaging end thereof has a major axis extending at an inclined angle with respect to said belt side edges.

16. The scraper assembly according to claim 15, wherein said carrier member has a reference point between said opposite ends thereof, said plurality of scraper bars including first and second pluralities of bars on opposite sides of said reference point, the major axes of the belt engaging ends of said first plurality being parallel to one another, the major axes of the belt engaging ends of said second plurality being parallel to one another, and the major axes of said first and second pluralities having corresponding ends converging with respect to said reference point.

17. The scraper assembly according to claim 16, wherein in said means supporting said carrier member includes a shaft parallel to and interconnected with said carrier and pivotal about said pivot axis, and said biasing means includes an arm attached to said shaft and extending therefrom transverse to said pivot axis and a weight selectively positionable along said arm.

* * * * *